J. KIGAS.
FLOOR AND SURFACING MACHINE.
APPLICATION FILED FEB. 28, 1921.
1,435,967.
Patented Nov. 21, 1922.
6 SHEETS—SHEET 1.
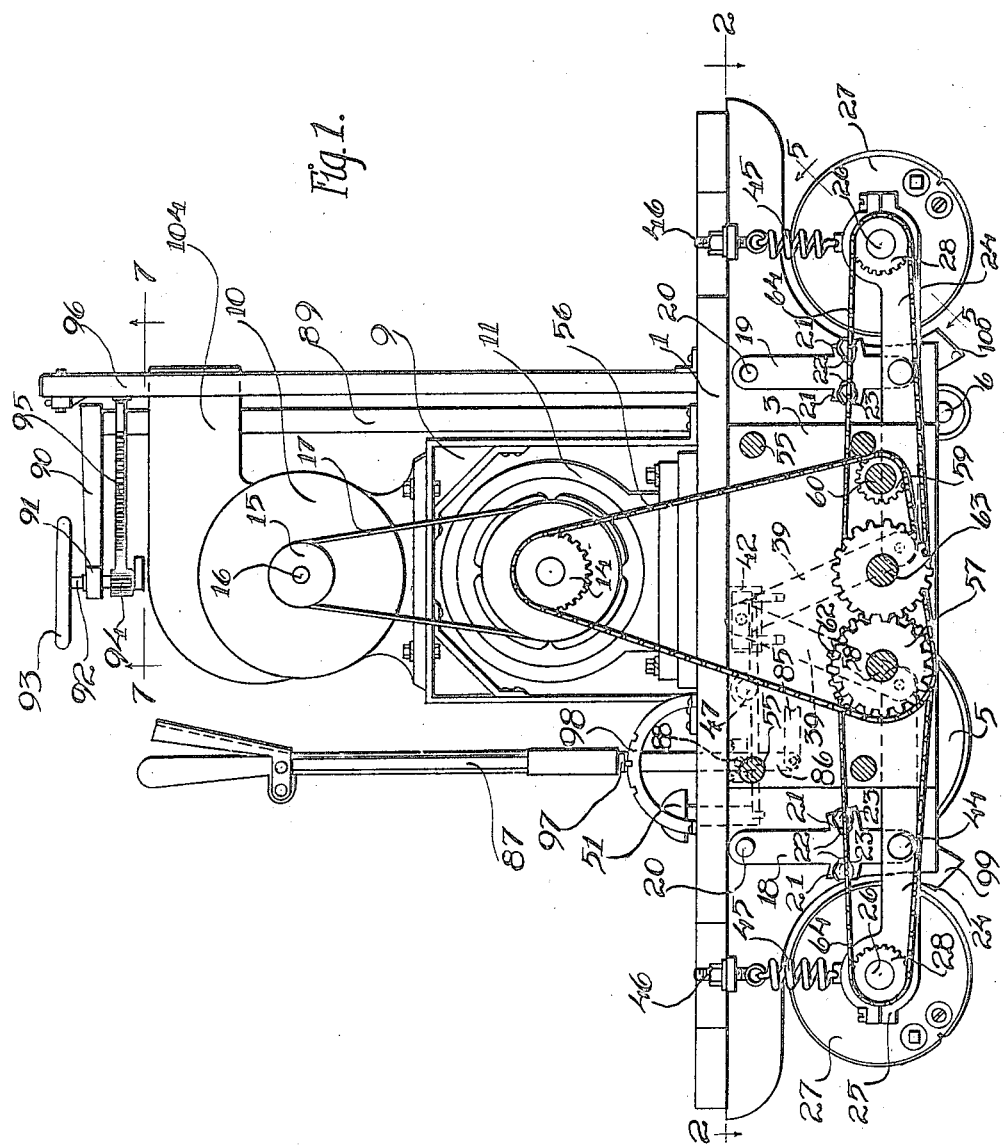
Inventor
John Kigas
By Frank N. Thomason
Atty.

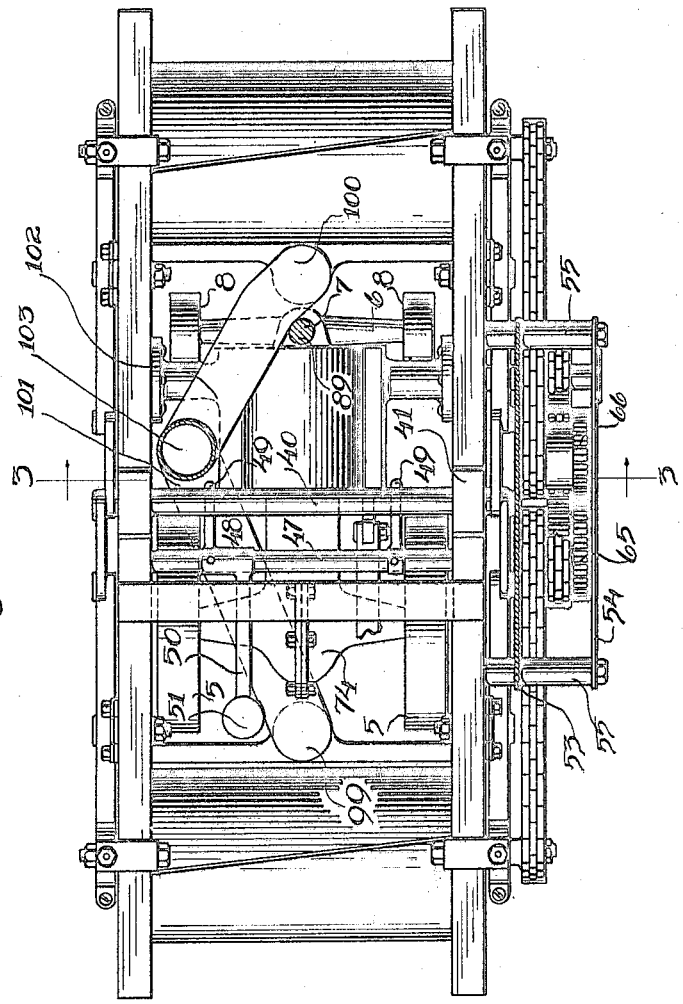

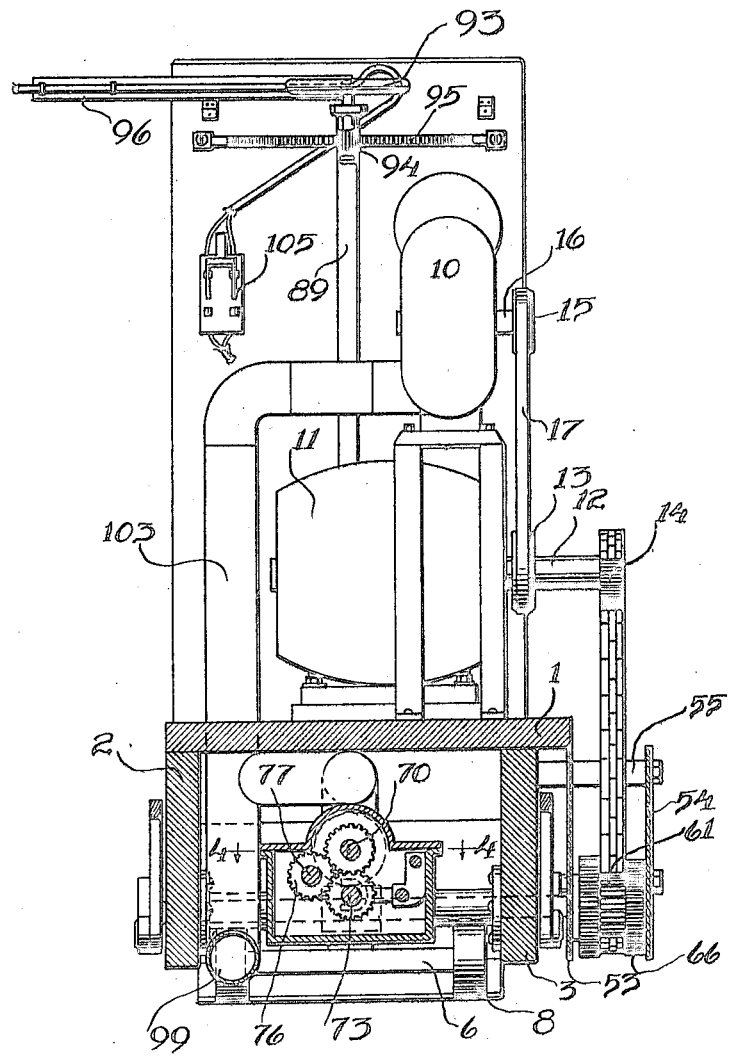

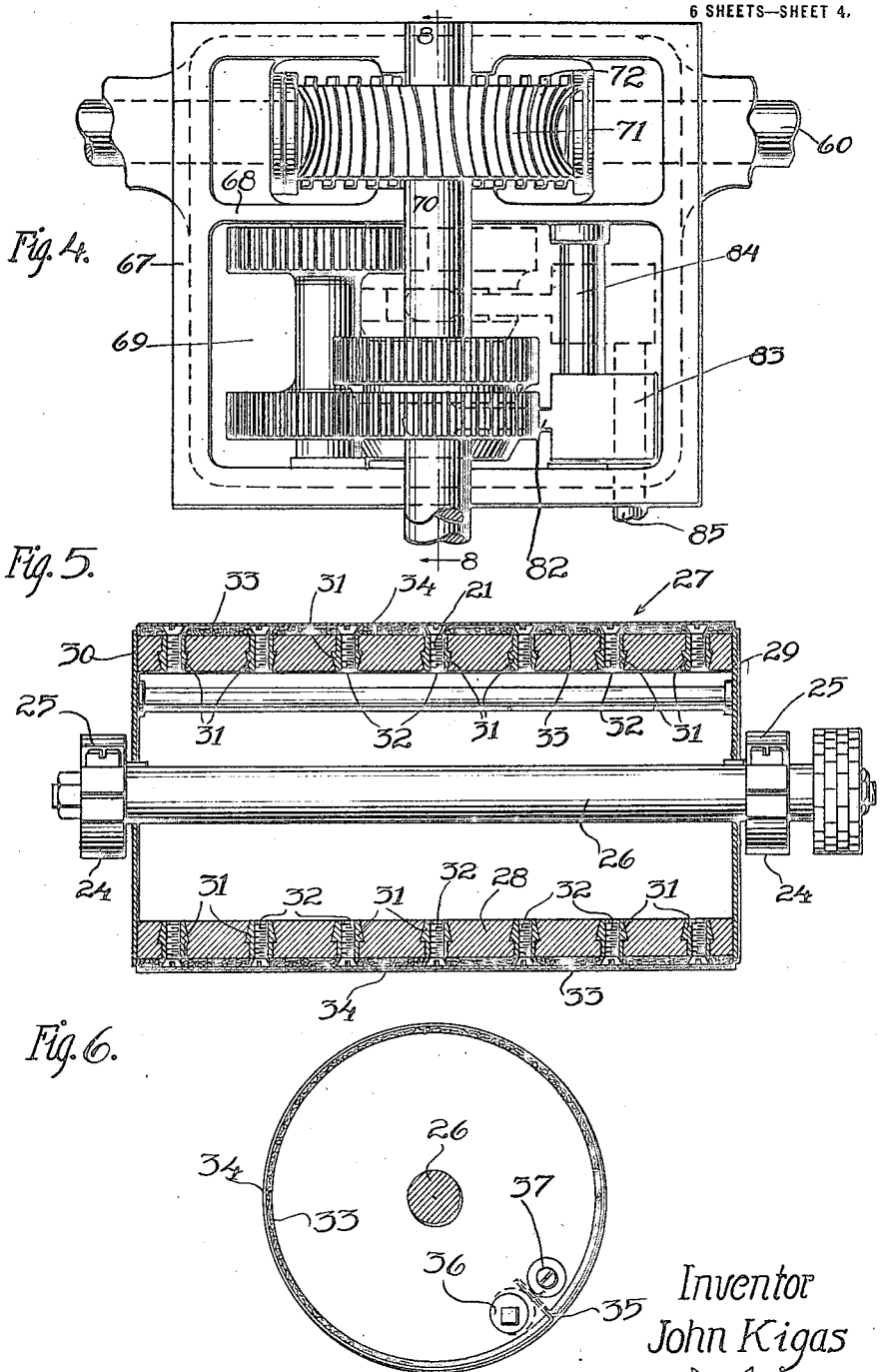

J. KIGAS.
FLOOR AND SURFACING MACHINE.
APPLICATION FILED FEB. 28, 1921.

1,435,967.

Patented Nov. 21, 1922.

Inventor
John Kigas

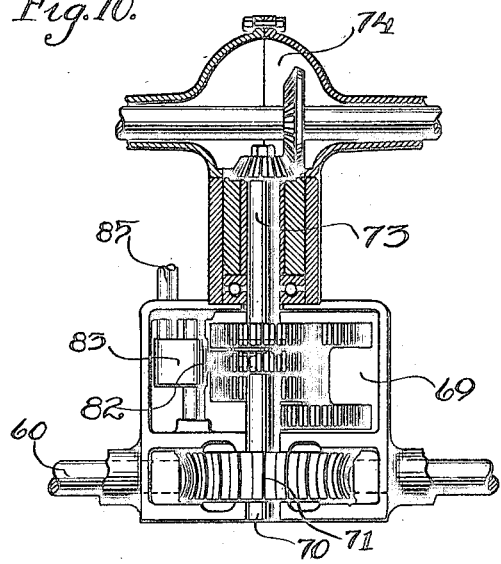
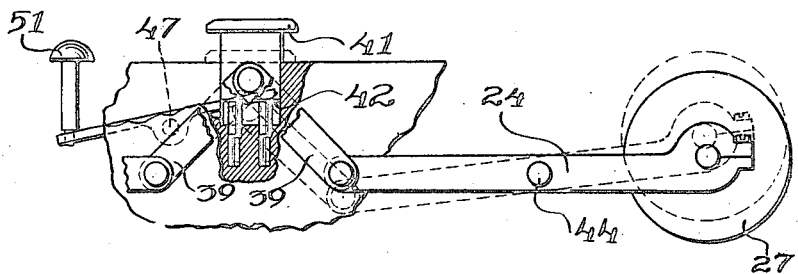

Patented Nov. 21, 1922.

1,435,967

UNITED STATES PATENT OFFICE.

JOHN KIGAS, OF CHICAGO, ILLINOIS, ASSIGNOR TO ALEX WASLEFF, OF CHICAGO, ILLINOIS.

FLOOR AND SURFACING MACHINE.

Application filed February 23, 1921. Serial No. 448,362.

*To all whom it may concern:*

Be it known that I, JOHN KIGAS, a citizen of Latvia, Russia, resident of Chicago, in the county of Cook and State of Illinois, have invented certain new and useful Improvements in Floor and Surfacing Machines, of which the following is a full, clear, and exact description.

My invention relates to sandpapering machines which are adapted to exercise a detergent and smoothing effect upon a surface such as flooring or the like, and the principal object consists in the provisions of a machine that is highly efficient, easy to manipulate and capable of performing to a much greater extent all of the requirements made of machines of this kind.

It is a further object of the invention to provide a sandpapering machine by abrading drums at both of its ends that are simultaneously operated by a motor and are easily conveyed over the surface of the flooring to be cleaned and smoothed for the purpose of continuously removing the surface of said flooring or the like.

It is a further object of the invention to provide a machine which is equipped with a plurality of rollers capable of engaging a flooring for the purpose of exercising a detergent and smoothing effect thereupon.

A further object aims at the provisions of a plurality of rollers which may be applied to a surface to be cleaned and smoothed with varying pressures.

It is a further object of the invention to provide a machine with a plurality of abrading rollers in combination with foot controlled means for varying the pressures with which the rollers are brought in contact with the surface to be cleaned.

It is also an object of the invention to provide certain details of arrangement and construction whereby the general desirability of such machines is greatly enhanced.

To the accomplishment of the objects stated and others which will become apparent upon perusal of the following description, the invention comprises means set forth in the specification, particularly pointed out in the claims forming a part thereof, and illustrated in the accompanying drawings, in which:

Figure 1 is a side elevation of the machine constructed in accordance with my invention with parts shown in section.

Figure 2 is a sectional plane, the section being taken on line 2—2, Figure 1.

Figure 3 is a transverse section on line 3—3, Figure 2.

Figure 4 is a detail section on line 4—4, Figure 3.

Figure 5 is a longitudinal section through one of the detergent rollers.

Figure 6 is an end view of the roller.

Figure 10 is a plan view, partly in section of a broken away portion of the machine showing the mechanism for imparting motion from the drive-shaft to the axle of the drive-shaft.

Figure 11 is a side view of a portion of the drop-frames of the supporting-frame disclosing means for controlling the downward pressure of the sandpapering drums.

Figure 7:
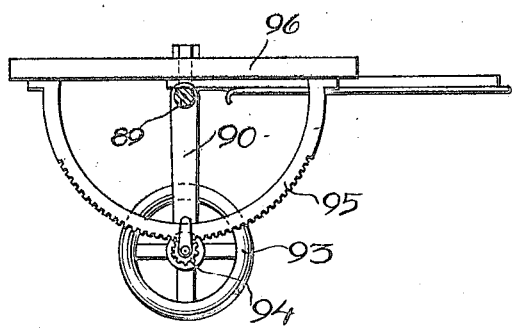
Figure 7 is a detail section on line 7—7, Figure 1.

Referring to the several views in the drawings, the machine comprises a platform 1, supported by longitudinal drop-frame members, 2 and 3, depending from the longitudinal sides of the platform which are of considerable depth and form a casing, open at the bottom, for the reception of the driving means, as will hereinafter appear.

The frame-member 2 is flush with the longitudinal edge of the platform 1, whereas the longitudinal frame-member 3 is inwardly spaced from the adjacent longitudinal edge of said platform 1. This frame structure is supported on a rear axle 4 equipped with running wheels 5, and by a front axle 6, that is pivoted intermediate its ends by means of a suitable king-pin as at 7, and is provided at its ends with running wheels 8 that track between the frame-members 2 and 3 of the machine. On the platform 1 a suitable scaffolding 9 is secured that carries a fan 10 of any suitable or preferred construction, and confined within framework of this scaffolding 9 is an electric motor 11 that is mounted on or secured to platform 1, and is provided with an extended armature shaft 12 on which a pulley 13, and spaced therefrom, a sprocket-wheel 14 are securely mounted. As indicated in Figure 3, the pulley 13 is in vertical alinement with a pulley 15 provided on the shaft 16 of a fan 10. A belt 17 connects pulleys 13 and 15, so that upon rotation of the motor the fan is driven with equal speed.

Pivotally secured at their upper ends by means of pins 20 to the inner surfaces and near both ends of the longitudinal frame-members 2 and 3 are vertically disposed hangers 18 and 19, one pair of which are arranged opposite each other in the same transverse plane near one end of the supporting-frame and the other pair of which are similarly arranged near the other end thereof, as viewed in Figure 1. These hangers are provided intermediate their ends with lateral lugs 21, that are provided with slots 22 for the passage of bolts 23, so that the hangers may be adjusted slightly, in an arc of a circle struck from pins 20, and secured to the longitudinal frame-members. The lower ends of each hanger 18 and 19 are articulated with, or have fulcrumed thereto, the intermediate portions of horizontal rocking-frames 24, as at 44. The rocking-frames on each side of the machine aline with each other.

The ends of these rocking-frames farthest from the center of length of the machine have bearings 25 to receive the journals of the shafts 26 of sandpapering drums 27, the ends of the cylindrical portion 28 of which are closed by heads 29 and 30. The cylindrical portion 28 of said drums is traversed by a plurality of bushings 31 arranged in longitudinal series and adapted to receive screws 32, and the heads of these screws are countersunk into and secure a layer of resilient material or pad 33 to the outer periphery of said cylindrical portion. A detergent or abrading paper, such as sandpaper 34 is wrapped tightly once around the pad 33, and the end edges thereof are inserted in or threaded through a longitudinal slot 35 extending, preferably, from end to end of the cylindrical portion, and inside of the drums these ends pass between two longitudinally disposed rods 36 and 37. One of these rods, 37, has its ends immovably secured in the heads of the drums, but the other has eccentric journals that extend through said heads and are threaded to receive nuts 36ª. When the edges of the sandpaper are inserted between these rods, rod 36 is turned in its eccentric journals and clamp the edges of the sandpaper between it and rod 37, and then the nuts 37ª are tightened to retain the rods in their clamping positions. The shafts 26 of both drums carry, at one end, a sprocket-wheel 38, whereby rotation is imparted to the drum, as will hereinafter appear.

The opposing ends of the rocking-frames 24 on the same side of the machine, are articulated to links 39 that incline toward each other and converge at their upper ends where they are pivoted to the ends of a cross-bar 40, which are seated and have vertical movement in the cut-out portions or recesses, 42, in the longitudinal frame members 2 and 3.

From the foregoing it will be noticed that during the upward movement of the cross-bar 40, the links 39 will be lifted and will cause the oscillation of the rocking-frame 24 about its fulcrum 44 so that the opposing ends thereof, connected to said links will move upwards, and the opposite ends carrying the drums 27 will move downwards and force said drums 21 downwards and into contact, with increased pressure against the flooring or other surface to be smoothed and cleaned. A strong helical spring 45 connects the bearing 25 of each rocking-frame with an eye bolt 46, secured to the adjacent drop frame-member, so that, normally the adjacent drums 27 will be in raised position and maintained in an inoperative or idle position.

A transverse rock-shaft 47 is journaled in the frame-members 2 and 3 and has arms 49, 49, projecting therefrom, that extend under and bear upwards against cross-bar 40 near each drop frame. The boss 48 of one of these arms, has an arm 50, extending in the opposite direction therefrom, that is, preferably, longer than arms 49, and, the end of arm 50 farthest from shaft 47, has a stud 51, projecting upwards therefrom, through platform 1, whose upper end is provided with a knob or head. As appears from Figure 1, upon pressure being applied to the headed-stud 51, rock-shaft 47 will oscillate, and fingers 49, 49, will lift the cross-bar 40, and the links 39 will cause the adjacent ends of the horizontal rocking-frames 24 to be raised, and force the abrading drums 27 into engagement with the surface to be cleaned and smoothed. The downward movement of said drums overcomes the tendency of the retractile springs 45 to maintain the drums in raised position. According as more or less pressure is applied to the treadle 51, the pressure of the drums 27 against the surface to be cleaned may be varied.

Two transverse shafts 58 and 63 respectively, are placed between and have their ends journaled in the apron 53 and shield 54, and these shafts are connected by intermeshing spur-gears 65 and 66 that are mounted upon and secured to the same next said shield. The shaft 63 is, preferably, arranged immediately below, midway the length of said apron and shield, and parallel to the armature 12 of the motor, and both this shaft 63 and 58 have, respectively, sprocket-wheels 62 and 58ª mounted and secured thereon next their bearings in apron 53. These sprocket wheels 62 and 58ª are connected and impart motion to the sprocket-wheels 38 on the corresponding ends of the shafts 26 of the sandpapering drums through the medium of link chain belts 64, 64. Shaft 58 is driven by the motor through the medium of sprocket-wheel 14, and a chain belt 56, which latter engages a sprocket-wheel 61, mounted and secured on said shaft 58 between gears 65 and 62.

This belt 56 also passes around and drives a sprocket-wheel 59, mounted upon and secured to a transverse shaft 60, in line with the gear 61 on shaft 58 and this shaft 60 extends through suitable openings or bearings in the shield and apron and extends through and is journaled in bearings in the drop-frames 2 and 3 and constitutes the drive-shaft through the medium of which the supporting-frame is propelled. In order to perform this function it passes transversely through a suitable housing 67, and within this housing has a worm 72 securely mounted thereon that engages a worm-gear 71 on the adjacent end of a short longitudinal transmission shaft 70, which latter is journaled in the ends of the housing 67 and in a partition, 68, that separates the chamber in which the worm and worm-gear mesh from the remainder of the interior of the housing constituting a chamber 69. Within chamber 69, transmission-shaft 70 has a pair of connected or twin gears 75 securely mounted thereon, and one of the twins is in constant mesh with an idle-gear 76 keyed to an idle-shaft 77 whose ends are journaled in partition 68, and in the end of the housing constituting the opposite wall of chamber 69. Idle-shaft 77 has another idle-gear 78 securely mounted thereon near the partition 68 that, preferably, corresponds in construction and dimensions to idle-gear 76, and this latter gear is adapted to be engaged by a gear 79 that is splined to and is adapted to reciprocate on a longitudinal driven-shaft 73. When reciprocated to the limit of its movement toward the partition gear 79 engages the idle-gear 78, and is driven and imparts motion to shaft 73 in one direction, and when reciprocated to the limit of its movement in the opposite direction, it engages the nearest of the twin gears 75, and is driven and imparts motion to shaft 73 in the opposite direction. Shaft 73, is extended through its bearings in the end wall of housing 67 to and enters the centrally situated enlargement of the tubular casing 74, where its end has a bevelled gear,—secured thereon that meshes with a bevelled gear—mounted on the axle—of the drive-wheels 5, 5.

The sliding gear 79 is formed with an elongated hub 80, equipped with a circumferential groove 81, to receive prongs 82 of a block 83, slidable on a rod 84 which latter extends parallel to the driven shaft 70 and slides in bearings provided in one end wall of the gear casing 67 and in the intermediate wall 68. Block 83 is pivotally connected by a link 85 to the lower end 86 of a hand lever 87, pivotally secured as at 88, and is adapted to shift the block 83 into one of three positions, as indicated in dotted and full lines in Figure 8. The lever 87 is provided with a spring-controlled pawl 97 adapted to enter notches in a quadrant 98 secured to the platform 1.

Figure 8:
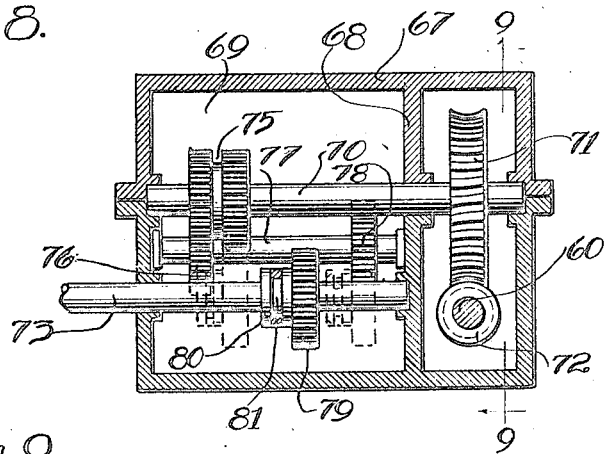
Figure 8 is a section on line 8—8, Figure 4.
Figure 9:
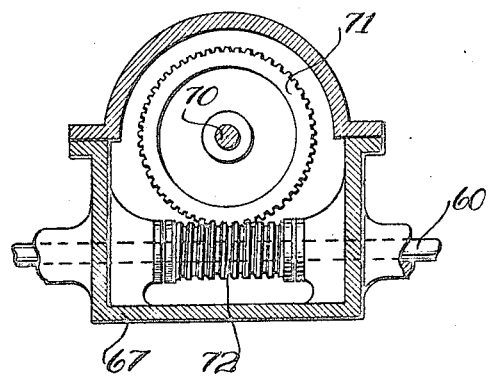
Figure 9 is a section on line 9—9, Figure 8.

Referring to Figure 8 it will be seen that in the extreme left position shown in dotted lines, the slidable gear 79 meshes directly with the gears 75 while in the extreme right position the gear 79 engages the rear wheel 78, so as to receive rotation from the driven shaft 70 by the agency of the idler gear 76.

A vertical steering-post 89 is secured to the center of length of the front axle 6, and its upper end has a horizontal arm 40, projecting therefrom which, at its free end, is formed with a boss 91 in which a spindle 92 has bearings. This spindle has at its upper end, a hand-wheel 93, and at its lower end has keyed thereto a pinion 94 that meshes with a toothed quadrant 95 secured to a standard 96 secured to and arising from the platform 1.

Upon manipulation of the hand-wheels 93, the pinion 94 is rotated and, being in mesh with the quadrant 95 the arm 90, is oscillated and the steering post 89 is rotated to impart steering movement to the front-axle 6.

For the purpose of removing loosened dirt, shavings and dust from the surface being operated upon, pipes 99 and 100 terminate adjacent to the inner side of each of the abrading drums 27,—the lower ends of the pipes being expanded laterally and bevelled to facilitate the entrance of said debris. Pipes 99 and 100 are connected by branches 101 and 102 to a common riser pipe 103, which latter leads to the inlet opening of the fan 10 and is discharged through the exhaust 104.

The operation of the machine is thought to be obvious from the foregoing description.

The connection of the motor 11 to a source of electric power is controlled by an electric switch generally designated by 105. Upon closing the switch the motor is actuated and thereby the drums 27, the fan 10, and the drive-shaft 60 are simultaneously rotated. The operator stands upon the platform 1 and foot pressure is applied to the headed-pin or treadle 51, to depress the drums 27 and press the same downwards to obtain the desired functional contact with the surface to be smoothed. The drive to the rear wheels will propel the entire machine so that every part of the surface may be reached; the steering means enabling convenient travel in any direction. To reverse the direction of travel of the machine, lever 87 is actuated to enter with its pawl 97 that outer notch which has not previously been engaged by the pawl. To maintain the machine in a certain position while the motor is runnnig, the lever is arranged to center with a pawl in the central notch in the quadrant 98 as appears in Figure 1.

The drawings disclose the preferred form of the invention, but various changes, alterations, and modifications may be made constituting departures therefrom that come within the scope of the invention. It is, therefore, not my intention to limit myself to the exact details of construction and arrangement of parts as shown, but to claim my invention as broadly as the state of the art will permit.

What I claim as new is:

1. In a machine of the character described, a supporting-frame, rocking-frames pivoted to said supporting-frame intermediate their ends, drums journaled in one end of said rocking frames, means acting on the other ends of said rocking-frames for placing said rollers in contact with a surface to be operated upon, and springs acting on the ends of the rocking-frame in which said drums are journaled for maintaining the drums in inoperative position.

2. In a machine of the character described, a supporting-frame, rocking-frames pivoted thereto intermediate their ends, drums journaled in the projecting ends of said rocking-frames, means acting on the other ends thereof, for adjustably placing said drums in contact with a surface to be operated upon and devices for adjusting the pivots of said rocking-frames.

3. In a machine of the character described, a wheeled supporting-frame, a plurality of hangers pivotally secured at their upper ends to said frame, means for adjusting the position of said hangers, rocking-frames pivoted mediate their ends to the lower ends of said hangers, drums journaled in the projecting ends of said rocking-frames, and means acting on the other ends of the latter for placing the drums in contact with a surface to be operated upon.

4. In a machine of the character described, a wheeled supporting-frame, depending hangers pivoted at their upper ends to said frame, means for adjustably securing said hangers to said frame, rocking-frames pivoted between their ends to the lower ends of said hangers, drums journaled in the projecting ends of the rocking-frame, a vibratory cross-bar, links connecting the ends of said rocking-frame opposite the drums with said bar and mechanism for imparting vibratory movement to said bar.

5. In a machine of the character described, a wheeled supporting-frame depending hangers pivoted at their upper ends to said frame, means for adjustably securing said hangers to said frame, rocking-frames pivoted to the lower ends of said hangers, drums journaled in the projecting ends of said rocking-frames, a vibratory mounted cross-bar, links connecting the ends of the rocking-frame with said bar, and foot operated means for imparting vibratory movement to said bar.

6. In a machine of the character described, a supporting-frame, wheeled shafts for said frame, depending hangers pivotally secured to the sides of said frame, means for adjustably securing said hangers to said supporting-frame, horizontally disposed rocking-frames pivoted between their ends to the lower end of said hangers, abrading drums journaled in the ends of said rocking-frames nearest the ends of the machine, retractile springs connecting said rocking-frame ends with said supporting-frame, a vertically vibratory cross-bar, links connecting the ends thereof with the contiguous ends of the rocking-frame, and a treadle for vibrating said cross-bar.

7. In a machine of the character described, a supporting-frame, mounted on wheels, a motor carried by said frame and adapted to propel said frame, depending hangers pivotally secured to said frame, means for adjustably securing said hangers to said frame, alining rocking-frames on each side of the machine pivoted between their ends to said hangers, abrading drums journaled in the ends of the rocking-frames contiguous to the ends of the machine, a vertically vibratory cross-bar, links connecting the ends of said cross-bar with the opposing ends of the rocking-frames, a treadle for vibrating said cross-bar, mechanism for moving said rocking-frames to bring said drums into an idle position upon the release of said treadle, and means actuated by said motor for removing material loosened by said drums.

8. In a machine of the character described, a supporting-frame, mounted on wheels, a motor carried by said frame and adapted to propel said frame, hangers pivotally secured to the sides of said supporting-frame, means for adjustably securing the hangers to said frame, alining rocking-frames pivoted between their ends to the lower ends of said hangers abrading drums journaled in the ends of said rocking-frames contiguous to the ends of the machine, vertical vibratory cross-bar, links connecting said cross-bar with the opposing ends of said rocking-frames, a treadle for vibrating said crossbar, resilient means for moving said rocking-frames into position where said drums will be in idle position upon release of said treadle, and suction means actuated by said motor for removing material loosened by said rollers.

9. In a machine of the character described, a supporting-frame, mounted upon wheels, a motor adapted to propel said supporting-frame, depending hangers pivotally secured to the sides of said frame, means for adjustably securing hangers to said frame, horizontally disposed alining rocking-frames pivoted between their ends to said hangers abrading drums journaled in the ends of said rocking-frame adjacent to the ends of the machine, a vertically reciprocal vibratory cross-bar, links connecting the ends of said bar to the opposing ends of said rocking-frames, a treadle for vibrating said bar, means including said rocking-frame for arranging said drums in idle position upon release of said treadle, suction devices actuated by said motor for removing material loosened by said drums, and means for reversing the drive of said motor to said running wheels.

In witness whereof I have hereunto set my hand this 22nd day of February, A. D. 1921.

JOHN KIGAS.

Witnesses:
  FRANK D. THOMASON,
  HENY F. VAN EPERTE.